United States Patent [19]

Tung et al.

[11] 4,427,837

[45] Jan. 24, 1984

[54] PROCESS FOR PREPARATION OF DIENE-STYRENE-α-METHYLSTYRENE BLOCK POLYMERS AND POLYMERS THEREFROM

[75] Inventors: Lu Ho Tung; Grace Y-s. Lo, both of Midland, Mich.

[73] Assignee: The Dow Chemical Company, Midland, Mich.

[21] Appl. No.: 297,371

[22] Filed: Aug. 28, 1981

Related U.S. Application Data

[63] Continuation-in-part of Ser. No. 248,623, Mar. 27, 1981, abandoned, which is a continuation-in-part of Ser. No. 176,884, Aug. 11, 1980, abandoned.

[51] Int. Cl.$^3$ .............................................. C08F 297/04
[52] U.S. Cl. .................................................... 525/314
[58] Field of Search .......................................... 525/314

[56] References Cited

U.S. PATENT DOCUMENTS

| | | | |
|---|---|---|---|
| 3,265,765 | 8/1966 | Holden | 260/879 |
| 3,925,512 | 12/1975 | Roest et al. | 260/880 B |
| 4,089,913 | 5/1978 | Miki et al. | 260/880 B |
| 4,201,848 | 5/1980 | Kotani et al. | 525/314 |
| 4,232,137 | 11/1980 | Irvin et al. | 525/314 |

FOREIGN PATENT DOCUMENTS 1264741  2/1972  United Kingdom .

*Primary Examiner*—Paul R. Michl
*Attorney, Agent, or Firm*—R. B. Ingraham

[57] ABSTRACT

Diene-styrene-α-methylstyrene block polymers are prepared by polymerization in excess α-methylstyrene with a lithium initiator wherein styrene-α-methylstyrene block is polymerized at a temperature from about 20° centigrade to about 160° centigrade with the ratio of styrene to α-methylstyrene being from about 50 to 1 to about 1 to 50.

30 Claims, No Drawings

PROCESS FOR PREPARATION OF DIENE-STYRENE-α-METHYLSTYRENE BLOCK POLYMERS AND POLYMERS THEREFROM

This application is a continuation-in-part of the copending Application Ser. No. 248,623, filed Mar. 27, 1981, abandoned, which is a continuation in part of the Application Ser. No. 176,884, filed Aug. 11, 1980, now abandoned.

Block polymers of α-methylstyrene and butadiene of the ABA configuration wherein A represents a block of α-methylstyrene and B represents a butadiene block are known and disclosed in British Pat. No. 1,444,680, and are also described in the *Journal of Applied Polymer Science*, Volume 22, 2907–2913 (1978). α-Methylstrene has a relatively low ceiling temperature of about 61° centigrade. The ceiling temperature is that temperature at which the rate of depolymerization equals the rate of polymerization. The desirability of employing a copolymer of styrene and α-methylstyrene as a block has been set forth in our copending application Ser. No. 095,696, filed Nov. 19, 1979. Generally α-methylstyrene polymerization proceeds slowly and because of the low ceiling temperature must be carried out at relatively low temperatures.

It would be desirable if there were available an improved process for the preparation of diene-α-methylstyrene containing block polymers.

It would also be desirable if there were available an improved process for the preparation of such polymers which would permit relatively rapid polymerization of monomers.

It would also be desirable if there were available an improved process for the preparation of thermoplastic elastomers and impact resistant thermoplastics.

These benefits and other advantages in accordance with the present invention are achieved in a process for the preparation of block polymers by the sequential polymerization of at least one conjugated diene monomer to form a diene polymer block and copolymerization of a vinyl aromatic monomer and an isopropenyl aromatic monomer to form a vinyl aromatic monomer-iso-propenyl aromatic monomer block, the polymerization being conducted in a solvent, the solvent comprising the isopropenyl aromatic monomer, the isopropenyl aromatic monomer being present in an excess of at least 2 moles per liter of reaction mixture, polymerization being initiated by a lithium based polymerization initiator, maintaining the monomeric components at temperature between about 20° centigrade and about 160° centigrade and preferably from 45° to 160° centigrade during the formation of the vinyl aromatic monomer-isopropenyl aromatic monomer polymer block to thereby provide a diene vinyl aromatic monomer-iso-propenyl aromatic monomer block copolymer wherein the mole ratio of vinyl aromatic monomer to isopropenyl aromatic monomer is from about 50 to 1 to about 1 to 50 and advantageously from about 1 to 0.5 to about 1 to 2.5.

Also contemplated within the scope of the present invention is a block copolymer of the formula AB(-BA)$_n$ wherein n has a value of 0 or greater. A represents a block of a copolymer of vinyl aromatic monomer-isopropenyl aromatic monomer wherein the ratio of vinyl aromatic monomer to isopropenyl aromatic monomer is from about 50 to 1 to about 1 to 50 and preferably from 1 to 0.5 to 1 to 2.5; B is a diene polymer block wherein the diene is selected from a group consisting of 1,3-butadiene and isoprene and mixtures thereof containing 0 to 40 weight percent of aromatic monomer copolymerizable therewith wherein the weight ratio of A block to B block varies from about 50 to 1 to 1 to 50 and preferably 90 to 10 and 10 to 90.

By the term vinyl aromatic monomer is meant a monovinyl aromatic monomer of the formula:

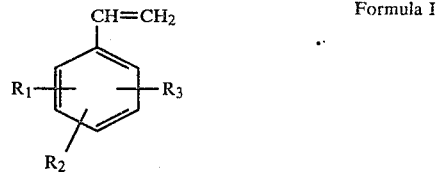

Formula I wherein $R_1$, $R_2$ and $R_3$ are individually selected from the group of hydrogen radicals, alkyl radicals, with the further limitation that the total number of carbon atoms in $R_1$, $R_2$, and $R_3$ is not greater than ten and mixtures thereof. Such vinyl aromatic monomers include styrene, methylstyrene, ethylstyrene, dimethylstyrene, trimethylstyrene, tertiary butylstyrene, tertiary amylstyrene, tertiary hexylstyrene, octylstyrene, 2-ethylhexylstyrene, decylstyrene and the like. Any isomer of the foregoing monomers is useful in the process of the invention; however for most applications, the para isomer is preferred such as paramethylstyrene. By the term isopropenyl aromatic monomer is meant a monoisopropenyl aromatic monomer of the formula:

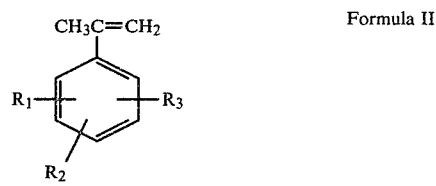

Formula II wherein $R_1$, $R_2$ and $R_3$ have the hereinbefore assigned values and limitations. Such isopropenyl aromatic monomers include α-methylstyrene.

By the term "aromatic monomer" is meant a monomer of Formula I or Formula II and mixtures thereof.

The resultant block copolymers may be elastomeric or resinous depending upon the proportions of the ingredients selected. Polymers prepared employing low portions of the diene, i.e., 2 to 40 weight percent polydiene, are generally resinous, transparent, and particularly suited for packaging applications wherein both low temperatures and high temperatures are encountered; for example, frozen foods which are subsequently heated prior to serving. Polymers in accordance with the present invention which contain higher proportions of the polydiene block, for example, from 50 to 80 weight percent polydiene, provide desirable thermoplastic elastomers having a relatively high service temperature and highly desirable low temperature characteristics. Polymers of the invention containing over 80 to 98 weight percent polydiene are elastomers of improved green strength. Polymers containing from about 40 to 50 weight percent diene are what might be considered soft plastics. The molecular weight of the block copolymer in accordance with the present invention as determined by gel permeation chromatography will vary from about 5,000 to 800.000 molecular weight units. Particularly desirable polymers for most applications have a molecular weight range from about 20,000 to 500,000 molecular weight units.

Preferably the polymer blocks B are elastomeric polymer blocks of an unsaturated diene such as butadiene, isoprene or mixtures thereof containing from about 0 to about 40 weight percent of aromatic monomer copolymerizable therewith such as styrene, α-methylstyrene or mixtures thereof. It is essential to the present invention that the 1,2-vinyl polydiene microstructure content of the polydiene block be not greater than 25 percent, the 1,2-vinyl content being computed from the infrared spectrum by the method of P. Morero et al., as set forth in Chim, Ind. Milan, 41, 758 (1959). Block copolymers in accordance with the present invention may be of the linear AB or ABA configuration or the branched configuration such as $AB(BA)_n$. In the preparation of a linear polymer such as of the ABA configuration, a difunctional lithium initiator may be employed; whereas in the preparation of the simplest branched or radial polymer having the structure $AB(BA)_n$ a polyfunctional or multifunctional lithium polymerization initiator may be employed. By the term "simplest" is meant the index n in $AB(BA)_n$ is equal to or less than 3. In the preferred polymers of the invention n has an average value of 1 or greater and the junction between the A and B blocks may be tapered or nontapered. Multifunctional lithium containing initiators are well known in the art as is the use of such initiators in the polymerization of olefinically unsaturated hydrocarbon monomers. Such polymers and initiators are disclosed in the following U.S. Pat. Nos.: 3,660,536; 3,663,634; 3,668,263; 3,684,780; 3,725;368; 3,734,973; 3,776,893; 3,776,964; 3,784,637; 3,787,510; 3,954,894; 4,172,100; 4,172,190; 4,182,818; 4,196,153; 4,196,154; 4,200,718; 4,201,729 and 4,205,016, the teachings of which are herewith incorporated by reference thereto. It is known that very desirable lithium initiators can be prepared by the addition of two moles of an organo lithium compound, such as butyl lithium, to one mole of a compound containing two 1,1-diphenylethylene groups.

The method of the present invention can be used in a variety of ways. For example in the preparation of AB block copolymer employing an initiator such as secondary butyllithium or normal butyllithium, several procedures may be used. A tapered AB block copolymer can be prepared by admixing the isopropenyl aromatic monomer such as α-methylstyrene, diene and vinyl aromatic monomer such as styrene, adding initiator to provide a tapered AB polymer. Alternatively isopropenyl aromatic monomer and diene are admixed, initiator added, the diene polymerized, subsequently the vinyl aromatic monomer is added to the reaction mixture to provide a polymer with a polybutadiene block attached to a vinyl aromatic monomer-isopropenyl aromatic monomer copolymer block. A similar block copolymer can be prepared by admixing the isopropenyl aromatic monomer with the vinyl aromatic monomer and immediately after the vinyl aromatic monomer-isopropenyl aromatic monomer copolymerization is complete, the diene is added resulting in AB polymer with a polydiene block and an isopropenyl aromatic monomer-vinyl aromatic monomer copolymer block. ABA polymers are readily prepared employing the method of the present invention, employing a difunctional organolithium initiator by admixing, for example, α-methylstyrene, styrene and diene, adding initiator and on polymerization a tapered ABA α-methylstyrene-styrene diene polymer is obtained. Alternatively, the isopropenyl aromatic monomer such as α-methylstyrene and diene are admixed, the initiator added, on completion of the polymerization of the diene, the vinyl aromatic monomer such as styrene is added to provide an ABA α-methylstyrene-styrene terminal block and a polydiene central block. Polymers of the ABA configuration are also prepared using monofunctional initiator such as secondary butyllithium or a normal butyllithium by admixing the isopropenyl aromatic monomer and vinyl aromatic monomer, adding initiator, on completion copolymerization of the aromatic monomers the diene is added, on completion of polymerization of the diene a coupling agent is introduced to the reaction mixture thereby providing a polymer of ABA configuration.

Another route to an ABA polymer is to admix the aromatic monomers with a nonfunctional initiator, when copolymerization of the vinyl aromatic monomer is complete, diene monomer is added, on completion of polymerization of the diene monomer additional vinyl aromatic monomer is provided to the reaction mixture resulting in an ABA polymer having a polydiene center block and aromatic monomer copolymer terminal blocks. Alternatively a vinyl aromatic monomer-isopropenyl aromatic monomer mixture may be initiated and prior to completion of the copolymerization, diene monomer is added, also resulting in a polymer having ABA configuration.

So-called radial, star or multi-armed polymers desirably are prepared employing a polyfunctional initiator using the general procedure hereinbefore set forth wherein a tapered diene polymer block copolymer may be obtained or a homo polydiene block obtained depending upon the sequence of monomer addition as hereinbefore set forth. An alternate route to radial block copolymers is to prepare a living polymer of the AB configuration employing a multifunctional coupling agent; for example, silicon tetrachloride, divinylbenzene and like, well known polyfunctional coupling agents.

The present invention is further illustrated, but not limited, by the following examples. All reactions and polymerizations described below were conducted under a dry nitrogen atmosphere. All glass containers were baked at 150° centigrade overnight, and flushed with nitrogen before use. The transfer of monomers and reagents was carried out with nitrogen flushed syringes. All monomers and reagents were purified according to the standard procedure used in anionic polymerization.

EXAMPLE 1

Preparation of tapered styrene-α-methylstyrene butadiene diblock copolymer

A 1-liter flask was charged with 506 grams of α-methylstyrene. The α-methylstyrene was then treated with 0.56 millimole of secondary butyllithium to inactivate residual moisture, oxygen and other impurities. 60 Grams of 1,3-butadiene together with 18 grams of styrene and 0.62 millimole of secondary butyllithium were added to the flask in that order. The flask was placed in a water bath having a temperature which vaired from about 45° to 60° centigrade and served to maintain the polymerization temperature. After a period of 5½ hours, the contents of the vessel became red in color. The temperature rose about 10° above that of the water bath indicating the beginning of polymerization of the styrene and α-methylstyrene copolymer block. The contents of the flasks were maintained at a temperature above about 60° C. for an additional 30 minutes after the appearance of the red coloration. 2 Milliliters of methanol were added to the reaction mixture to terminate the active polymer chains. Polymer was recovered from the reaction mixture by precipitation in methanol. Gel permeation chromatography was employed to determine the molecular weight of the product which was 350,000 grams per mole.

Nuclear magnetic resonance was employed to determine the composition of the block copolymer which was 59.6 weight percent butadiene, 18 weight percent styrene and 22.4 weight percent α-methylstyrene.

EXAMPLE 2

Preparation of tapered styrene-α-methylstyrene butadiene styrene-α-methylstyrene triblock copolymer A 1-liter flask was charged with 470 grams of α-methylstyrene which was then treated with 0.30 millimoles of secondary butyllithium to inactivate moisture, oxygen and other undesirable active compounds. Thirty-two grams of 1,3-butadiene and 41 grams styrene were added to the flask. An initiator solution was prepared by reacting a 3.08 millimole solution of secondary-butyllithium in 5.3 milliliters of cyclohexane with 1.54 millimole solution of 1,3-di[1-(4-methylphenyl)ethenyl]benzene in 25 milliliters of toluene for 19 hours at room temperature to obtain 1.54 millimole solution of a dilithium initiator 1,3-phenylene-bis(3-methyl-1-phenylpentylidene)-bis(lithium). The initiator was added to the flask and water bath having a temperature varying about 40° to about 50° C. was employed to obtain the polymerization temperature. After a period of 75 minutes, the mixture in the flask changed to a dark red color and the temperature of the contents rose to about 15° C. above that of the water bath indicating that the butadiene had all polymerized to form a block and the styrene α-methylstyrene copolymer blocks were being formed. The temperature of the reaction mixture was maintained over 60° C. for an additional 40 minutes after the appearance of the dark red color. 3 Milliliters of methanol were added to the flask to terminate active polymer chains. Polymer was recovered by precipitation in methanol. The molecular weight of the polymer as determined by gel permeation chromatography was 120,000 grams per mole. The weight composition based on total polymerization of butadiene and styrene monomers and nuclear magnetic resonance measurement was 30 percent butadiene, 39 percent styrene, 31 percent α-methylstyrene. 7 Weight percent of the total α-methylstyrene charged to the flask polymerized. The polymer was a thermoplastic having good clarity. Physical properties as determined from compression molded specimens were:
  Tensile Yield—3980 pounds per square inch
  Ultimate Elongation—33 percent
  Tensile Modulus—3.26×10$^5$ pounds per square inch
  Izod Impact Strength—0.9 foot pounds per inch of notch
  Vicat Softening Point—128° C.

EXAMPLE 3

Preparation of tapered triblock copolymer

The procedure of Example 2 was repeated with the exception that the following quantities of reactants were employed:
  α-Methylstyrene—410 grams
  1,3-butadiene—38 grams
  styrene—11 grams
  dilithium initiator—0.99 millimole The resultant tapered triblock polymer had a molecular weight of 108,000 grams per mole. The composition was 56.7 weight percent butadiene, 16.4 weight percent styrene and 26.9 weight percent α-methylstyrene. The polymer was a thermoplastic elastomer. The properties as determined from compression molded specimens were:
  Tensile rupture strength—3080 pounds per square inch
  Elongation at break—750 percent

EXAMPLE 4

Preparation of styrene-α-methylstyrene butadiene styrene-α-methylstyrene triblock copolymer The procedure of Example 2 was employed with the exception that the styrene monomer was added after completion of the butadiene polymerization and the following quantities of materials were employed:
  α-Methylstyrene—430 grams
  1,3-butadiene—42 grams
  Styrene—10 grams
  Dilithium initiator—0.87 millimole The resultant triblock copolymer had a molecular weight of 142,000 grams per mole as determined by gel permeation chromatography and a composition of 59 weight percent butadiene, 14 weight percent styrene and 27 weight percent α-methylstyrene. The polymer is a thermoplastic elastomer. Compression molded specimens showed a tensile rupture strength of 3860 pounds per square inch and an elongation at break of 750 percent.

EXAMPLE 5

Preparation of triblock copolymer styrene-α-methylstyrene butadiene styrene-α-methylstyrene The procedure of Example 2 was repeated with the following exception; the styrene monomer was added after the completion of butadiene polymerization and the following quantities of material were employed:
  α-Methylstyrene—470 grams
  1,3-butadiene—34 grams
  Styrene—43 grams
  dilithium initiator—1.58 millimoles The resultant triblock copolymer had a molecular weight of 88,000 grams per mole as determined by gel permeation chromatography and a composition of 32 weight percent butadiene, 41 weight percent styrene and 27 weight percent α-methylstyrene. The product was a thermoplastic resin of good clarity. Physical properties as determined from compression molded specimens were:
  Tensile yield strength—3250 pounds per square inch
  Ultimate elongation—8.3 percent
  Tensile modulus—2.1×10$^5$ pounds per square inch
  Izod impact strength—0.8 foot pounds per inch notch
  Vicat softening point—112° centigrade

EXAMPLE 6

Preparation of Triblock copolymer

The procedure of Example 4 was repeated with the following exception, that the styrene monomer was added in two portions 8 minutes apart following the completion of the butadiene polymerization. The materials used were 485 grams of α-methylstyrene, 42 grams of 1,3-butadiene. The first portion of styrene 20 grams; the second portion of styrene 20 grams and 1.38 millimoles of the dilithium initiator. The resultant triblock copolymer had a molecular weight of 94,000 as determined by gel permeation chromatography and a composition of 32.8 weight percent butadiene; 34.5 weight percent styrene and 32.7 weight percent α-methylstyrene. The physical properties as determined from compression molded specimens were:

Tensile yield strength—2360 pounds per square inch
Ultimate elongation—7.4 percent
Tensile modulus—$1.5 \times 10^5$ pounds per square inch
Izod impact strength—2.3 foot pounds per inch
Vicat softening point—115° centigrade

EXAMPLE 7

Preparation of triblock copolymer of coupling with phenyl benzoate

A 1-liter flask was charged with 410 grams of α-methylstyrene which was then treated with 0.9 millimole of a secondary butyllithium at room temperature to inactivate moisture, oxygen and other impurities. The contents of the flask were then heated to about 50° centigrade employing a water bath. 16.3 Grams of styrene monomer were added to the flask and a solution of 1.7 millimoles of secondary butyllithium in 3 milliliters of cyclohexane were added. The solution in the flask turned a red color and then a dark red color. The temperature of the reaction mixture rose to 67° centigrade, 17 degrees above that of the water bath. About 4 minutes after the appearance of the dark red color, 45 grams of 1,3-butadiene were added to the flask. The color of the contents of the flask changed from dark red to light yellow. The water bath temperature was maintained between about 40° to 60° C. for about 70 minutes. At the end of that time, a solution of 0.96 millimole of phenyl benzoate in 1.4 milliliters of toluene was added to the reaction mixture. The reaction mixture was maintained at a temperature of between about 50° and 60° centigrade for a period of about 1 hour after the addition of the phenyl benzoate. The reaction was terminated at that time by the addition of 0.2 milliliter of acetic acid. Polymer was recovered from the reaction mixture by precipitation in methanol. 89.5 Grams of polymer were obtained. The composition of the polymer was determined with the aid of gel permeation chromatography. The polymer contained 20 weight percent styrene-α-methylstyrene random copolymer; 10 weight percent styrene-α-methylstyrene butadiene diblock copolymer and 70 weight percent styrene-α-methylstyrene butadiene styrene-α-methylstyrene triblock copolymer. The weight composition of the triblock copolymer was 63 percent butadiene. 14 percent styrene and 23 percent α-methylstyrene. The molecular weight of the triblock copolymer as determined by gel permeation chromatography was 156,000 grams per mole. The product was a thermoplastic elastomer; physical properties as determined from compression molded specimens were:

Tensile rupture strength—3760 pounds per square inch
Elongation at break—780 percent

EXAMPLE 8

Preparation of triblock copolymer by coupling with bis(chloromethyl)diphenyl oxide The procedure of Example 7 was repeated with the exceptions that bis(chloromethyl)diphenyl oxide was employed in place of phenyl benzoate and the following materials and quantities were used. α-Methylstyrene 400 grams; styrene 12.7 grams; 1,3-butadiene 45 grams; secondary butyllithium 0.23 millimole for impurities; 1.81 millimoles for initiation; bis(chloromethyl)diphenyl oxide 0.73 millimole. The time allowed to polymerize the first block of styrene-α-methylstyrene block copolymer was 3 minutes. The temperature rose from 53° to 64° centigrade. Other conditions were as in Example 7.

The product was a thermoplastic elastomer weighing 83 grams. The product contained 11 weight percent styrene-α-methylstyrene random copolymer; 19 weight percent styrene-α-methylstyrene butadiene diblock copolymer and 70 weight percent of triblock styrene-α-methylstyrene butadiene styrene-α-methylstyrene copolymer. The molecular weight of the triblock copolymer was 116,000 grams per mole and the weight composition was 61 percent butadiene, 13 percent styrene and 26 percent α-methylstyrene. Physical properties obtained from compression molded specimens were:

Tensile rupture strength—3230 pounds per square inch
Elongation at break—690 percent

EXAMPLE 9

Preparation of radial block copolymer by coupling with silicon tetrachloride

The procedure of Example 7 was repeated employing silicon tetrachloride in place of the phenyl benzoate as a coupling agent, employing the following materials: α-methylstyrene 400 grams: styrene 12.7 grams; 1,3-butadiene 45 grams; secondary butyllithium 0.9 millimoles for impurities; 1.8 millimoles for initiation; silicon tetrachloride 0.48 millimole. The time allowed for polymerization of the first styrene-α-methylstyrene random block was 3 minutes and the temperature rose from 50° to 61° centigrade. Other conditions were as in Example 7.

The product was a thermoplastic elastomer weighing 82 grams and contained about 12 weight percent styrene-α-methylstyrene random copolymer and 88 weight percent radial block copolymer. The molecular weight of the radial block copolymer was 164,000 grams per mole and the weight composition was 62 percent butadiene, 13 percent styrene and 25 percent α-methylstyrene. The properties of the product as determined from compression molded specimens were:

Tensile rupture strength—3980 pounds per square inch
Elongation at break—570 percent

EXAMPLE 10

Preparation of styrene-α-methylstyrene butadiene styrene-α-methylstyrene triblock by step addition The procedure of Example 7 was repeated with the exception that styrene monomer was used in place of phenyl benzoate to permit the formation of a triblock copolymer of ABA configuration. The materials employed were α-methylstyrene 400 grams; styrene 6.8 grams for formation of the first block. An additional 5 grams of styrene were employed in place of phenyl benzoate; 1,3-butadiene 48 grams; 0.28 millimole secondary butyllithium for impurities, and 0.96 millimole for initiation.

The following polymerization conditions differed from those of Example 7:
(a) The time allowed for polymerization of the first block of styrene-α-methylstyrene was 3 minutes. The temperature rose from 53° to 60° centigrade.
(b) The second block polybutadiene required 125 minutes. The water bath was maintained between 40° and 60°.
(c) The third block of styrene-α-methylstyrene random copolymer was polymerized over a period of 15 minutes with a temperature of about 55° centigrade.

The product contained 87 grams of a thermoplastic elastomer containing about 8 weight percent styrene-α-methylstyrene random copolymer and 92 weight percent triblock copolymer. The molecular weight of the triblock copolymer was 131,000 grams per mole and weight composition of 60 percent butadiene, 12 percent styrene and 28 percent α-methylstyrene. Compression molded specimens of the product had a tensile rupture strength of 2930 pounds per square inch and an elongation at break of 510 percent.

EXAMPLE 11

Preparation of triblock copolymer by coupling with phenyl benzoate

The procedure of Example 7 was repeated with the following exceptions. The materials employed were:
α-methylstyrene—510 grams
styrene—40 grams
1,3-butadiene—27 grams
secondary butyllithium—
 0.41 millimoles for impurities
 2.05 millimoles for initiation
phenyl benzoate—0.91 millimoles The time allowed to polymerize the first block of styrene-α-methylstyrene random copolymer was 5 minutes and the temperature rose from 41° to 61° centigrade. Other conditions were those of Example 7.

The product was a medium impact transparent resin weighing 104 grams. The product contained 18 weight percent styrene-α-methylstyrene random copolymer, 6.0 weight percent diblock and 76 weight percent of triblock. The triblock copolymer had a molecular weight of 113,000 grams per mole and a weight composition of 31 percent butadiene, 36 percent styrene and 33 percent α-methylstyrene.

Compression molded specimens of the product had the following physical properties:
Tensile yield strength—4060 pounds per square inch
Ultimate elongation—10 percent
Tensile modulus—$2.09 \times 10^5$ pounds per square inch
Izod impact strength—0.4 foot pound per inch of notch
Vicat softening product—115° centigrade

EXAMPLE 22

Preparation of styrene-α-methylstyrene butadiene styrene-α-methylstyrene triblock copolymer having one end tapered A 1-liter flask was charged with 400 grams of α-methylstyrene. In order to remove residual moisture, oxygen and impurities, 0.42 millimole of secondary butyllithium in cyclohexane was added. The contents of the flask were heated to about 54° centigrade, 12.7 grams of styrene and 0.96 millimole of secondary butyllithium were added. The solution within the flask turned red in color and the temperature rose 5 degrees above that of the water bath in 1½ minutes. One and one-half minutes after the addition of the styrene, 45 grams of 1,3-butadiene were added and the reaction mixture color changed from red to light orange and then yellow. The water bath temperature was maintained between about 40° and 60° centigrade. About 110 minutes after the addition of the butadiene monomer, the polymerization mixture color changed to red, indicating completion of the butadiene block and start of polymerization of another styrene-α-methylstyrene copolymer block. About 30 minutes after the second appearance of red color, 1 milliliter of propanol-2 was added to terminate polymerization. The product was isolated as in Example 7. 79 Grams of a thermoplastic elastomer was obtained which was about 100 percent triblock copolymer. The molecular weight as determined by gel permeation chromatography was 92,000 grams per mole. The weight composition was 57 percent butadiene, 16 percent styrene, and 27 percent α-methylstyrene. Product physical properties as determined from compression molded samples were: tensile rupture strength 3070 pounds per square inch, and elongation at break 740 percent.

EXAMPLE 13

Preparation of Radial Block Copolymer by Coupling with Divinylbenzene

The procedure of Example 9 is repeated with the exception that purified divinylbenzene is employed in place of silicon tetrachloride, divinylbenzene is added slowly with vigorous agitation. A multifunctional radial block copolymer is recovered. The number of arms of the radial block copolymer is greater than 3. The number of arms of the radical block copolymer in general is dependent upon the amount of divinylbenzene employed. Preparation of multi-armed radial or star block copolymers is discussed at length by L-K. Bi and L. J. Fetters in *Macromolecules,* Volume 9, page 732 through 742, 1976.

EXAMPLE 14

Preparation of Tapered Styrene-α-Methylstyrene Isoprene Styrene-α-Methylstyrene Triblock Copolymer The procedure of Example 2 was repeated with the exception that the isoprene monomer was used in place of butadiene and the following quantities of reactants were used:
α-methylstyrene—359 grams
isoprene—34 grams
styrene—17.2 grams
dilithium initiator—0.99 millimole The resultant tapered triblock polymer had a molecular weight of 80,000 grams per mole. The composition was 50.0 weight percent isoprene, 25.3 weight percent styrene and 24.7 weight percent α-methylstyrene. The polymer was a thermoplastic elastomer. The properties as determined from compression molded specimens were:
Tensile Rupture Strength—2160 psi
Elongation at Break—400 percent

EXAMPLE 15

Preparation of Tapered Styrene-α-Methylstyrene Butadiene-Isoprene Styrene-α-Methylstyrene Triblock Copolymer The procedure of Example 2 was repeated with the exception that a mixture of butadiene and isoprene monomers was used in place of butadiene and the following quantities of reactants were used:

α-methylstyrene—364 grams
isoprene—17 grams
butadiene—19 grams
styrene—17.2 grams
dilithium initiator—0.86 millimole The resultant triblock copolymer had a molecular weight of 104,000 grams per mole as determined by gel permeation chromatography and a composition of 27 weight percent butadiene, 24 weight percent isoprene, 24 weight percent styrene, and 25 weight percent α-methylstyrene. The polymer is a thermoplastic elastomer. The properties as determined from compression molded specimens were:

Tensile Rupture Strength—3800 psi
Elongation at Break—660 percent

In a manner similar to the foregoing illustrations generally similar results are obtained when the hereinbefore delineated vinyl aromatic monomers and isopropenyl aromatic monomers or mixtures thereof are substituted for styrene and α-methylstyrene.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process for the preparation of block polymers by the sequential polymerization of at least one conjugated diene monomer to form a diene polymer block and copolymerization of a vinyl aromatic monomer and an isopropenyl aromatic monomer to form a vinyl aromatic monomer-isopropenyl aromatic monomer polymer block, the polymerization being conducted in a solvent, the solvent comprising the isopropenyl aromatic monomer, the isopropenyl aromatic monomer being present in an excess of at least 2 moles per liter of reaction mixture, polymerization being initiated by a lithium based polymerization initiator, maintaining the monomeric components at a temperature between about 20° centigrade and about 160° centigrade during the formation of the vinyl aromatic monomer-isopropenyl aromatic monomer polymer block to thereby provide a diene-vinyl aromatic monomer-isopropenyl aromatic monomer block copolymer wherein the ratio of vinyl aromatic monomer to isopropenyl aromatic monomer is from about 50 to 1 to about 1 to 50, with the further limitation that the molecular weight of the block copolymer as determined by gel permeation chromatography is from about 5,000 to 800,000 molecular weight units.

2. The process of claim 1 wherein the block copolymer contains from about 2 to 40 weight percent of diene monomer forming the diene polymer block.

3. The process of claim 1 wherein the block copolymer contains from about 50 to 98 weight percent of diene monomer forming the diene polymer block.

4. The process of claim 1 wherein the block copolymer contains from about 40 to 50 weight percent of diene monomer forming the diene polymer block.

5. The process of claim 1 wherein the diene monomer is butadiene.

6. The process of claim 1 wherein the diene monomer is isoprene.

7. The process of claim 1 wherein the diene monomer is a mixture of butadiene and isoprene.

8. The process of claim 1 wherein the lithium based polymerization initiator is polyfunctional.

9. The process of claim 8 wherein the lithium based initiator is difunctional.

10. The process of claim 1 wherein the lithium based initiator is monofunctional.

11. The process of claim 1 wherein the diene block is formed prior to the vinyl aromatic monomer-isopropenyl aromatic monomer block.

12. The process of claim 1 including the step of adding the vinyl aromatic monomer to the isopropenyl aromatic monomer in a continuous manner during the formation of the vinyl aromatic monomer-isopropenyl aromatic monomer block.

13. The process of claim 1 including the step of adding the vinyl aromatic monomer to the isopropenyl aromatic monomer in a discontinuous manner during polymerization of a vinyl aromatic monomer-isopropenyl aromatic monomer block.

14. The process of claim 1 including the steps of forming a living block copolymer of vinyl aromatic monomer-isopropenyl aromatic random copolymer block-diene polymer block wherein lithium terminates the diene block configuration and subsequently contacting the living block copolymer with a coupling agent.

15. The process of claim 1 wherein the vinyl aromatic monomer is styrene.

16. The process of claim 1 wherein the isopropenyl aromatic monomer is α-methylstyrene.

17. The process of claim 1 wherein the vinyl aromatic monomer is styrene and the isopropenyl aromatic monomer is α-methylstyrene.

18. The process of claim 1 wherein all monomers and solvent are in admixture prior to addition of the initiator.

19. A block copolymer of the formula $AB(BA)_n$ wherein n has a value of 0 or greater; A represents a block of a random copolymer of vinyl aromatic monomer and isopropenyl aromatic monomer wherein the ratio of vinyl aromatic monomer to isopropenyl aromatic monomer is from about 50 to 1 to about 1 to 50; B is a diene polymer block wherein the diene is selected from the group consisting of 1,3-butadiene and isoprene and mixtures thereof containing from 0 to 40 weight percent aromatic monomer copolymerizable therewith and having a 1,2-vinyl content of not greater than 25 percent wherein the ratio of vinyl aromatic and isopropenyl aromatic block to diene block varies from about 50 to 1 to 1 to 50, the molecular weight of the block copolymer as determined by gel permeation chromatography is from about 5,000 to about 800,000 molecular weight units.

20. The block copolymer of claim 19 wherein the vinyl aromatic monomer is styrene.

21. The block copolymer of claim 19 wherein the isopropenyl aromatic monomer is α-methylstyrene.

22. The block copolymer of claim 19 wherein the vinyl aromatic monomer is styrene and the isopropenyl aromatic monomer is α-methylstyrene.

23. The block copolymer of claim 19 wherein the diene monomer is butadiene.

24. The block copolymer of claim 19 wherein the diene monomer is isoprene.

25. The block copolymer of claim 19 wherein the diene monomer is a mixture of butadiene and isoprene.

26. The block copolymer of claim 19 wherein the ratio of A to B is from about 90 to 10 to 10 to 90.

27. The block copolymer of claim 19 wherein the A block contains vinyl aromatic monomer and isopropenyl aromatic monomer in the ratio of from about 1 to 0.5 to 1 to 2.5.

28. The block copolymer of claim 19 wherein n is 1 or greater.

29. The block copolymer of claim 28 wherein n is about 1.

30. The block copolymer of claim 19 wherein the molecular weight is about 20,000 to 500,000 molecular weight units.

* * * * *